(12) United States Patent
Ichida

(10) Patent No.: US 11,338,767 B2
(45) Date of Patent: May 24, 2022

(54) SEATBELT RETRACTOR

(71) Applicant: JOYSON SAFETY SYSTEMS JAPAN K.K., Tokyo (JP)

(72) Inventor: Atsushi Ichida, Echi-gun (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 0 days.

(21) Appl. No.: 17/058,827

(22) PCT Filed: Sep. 17, 2019

(86) PCT No.: PCT/JP2019/036284
§ 371 (c)(1),
(2) Date: Nov. 25, 2020

(87) PCT Pub. No.: WO2020/080012
PCT Pub. Date: Apr. 23, 2020

(65) Prior Publication Data
US 2021/0206342 A1 Jul. 8, 2021

(30) Foreign Application Priority Data

Oct. 17, 2018 (JP) .............................. JP2018-196023

(51) Int. Cl.
*B60R 22/46* (2006.01)
*B60R 22/28* (2006.01)

(52) U.S. Cl.
CPC .............. *B60R 22/46* (2013.01); *B60R 22/28* (2013.01); *B60R 22/4676* (2013.01)

(58) Field of Classification Search
CPC ... B60R 22/28; B60R 22/341; B60R 22/3413; B60R 22/46; B60R 22/4676; B60R 2022/281; B60R 2022/287
See application file for complete search history.

(56) References Cited

U.S. PATENT DOCUMENTS 6,276,626 B1 8/2001 Tanaka et al.
10,023,150 B2 * 7/2018 Hiramatsu .......... B60R 22/3413
(Continued)

FOREIGN PATENT DOCUMENTS

DE 10034393 A1 * 1/2002 ......... B60R 22/3413
JP H11-222100 A 8/1999
(Continued)

OTHER PUBLICATIONS

International Searching Authority, "International Search Report," issued in connection with International Patent Application No. PCT/JP2019/036284, dated Dec. 3, 2019.
(Continued)

*Primary Examiner* — Jonathan Ng
*Assistant Examiner* — Scott F. Underwood
(74) *Attorney, Agent, or Firm* — Foley & Lardner LLP

(57) ABSTRACT

A spool 20 and a locking base 40 are connected through a torsion bar 70. A stop gear 82 and a positioning member 86 are engaged through threads with the male thread 42c of a locking base 40 so as to be separated from each other a predetermined distance. The locking base 40 and the torsion bar 70 are mounted to the spool 20 while the distance of separation between the stop gear 82 and the positioning member 86 is accurately set to a specified distance. When the tension of webbing increases due to the movement of a vehicle occupant in a vehicle collision and provides the torsion bar 70 with EA rotation while twisting the torsion bar 70, the stop gear 82 advances toward the positioning member 86 and comes into contact therewith.

7 Claims, 9 Drawing Sheets

(56) References Cited

U.S. PATENT DOCUMENTS

| | | | |
|---|---|---|---|
| 10,246,047 B2* | 4/2019 | Hodatsu | B60R 22/34 |
| 2006/0082127 A1 | 4/2006 | Clute | |
| 2010/0116921 A1* | 5/2010 | Gray | B60R 22/4676 |
| | | | 242/374 |
| 2010/0301151 A1* | 12/2010 | Heitkamp | B60R 22/341 |
| | | | 242/379.1 |
| 2011/0121120 A1* | 5/2011 | Ogawa | B60R 22/4676 |
| | | | 242/379.1 |
| 2013/0126657 A1 | 5/2013 | Stroik, Jr. | |
| 2018/0037191 A1 | 2/2018 | Franz et al. | |

FOREIGN PATENT DOCUMENTS

| | | | | |
|---|---|---|---|---|
| JP | 2000-198417 A | 7/2000 | | |
| JP | 2005-035517 A | 2/2005 | | |
| JP | 2009-208659 A | 9/2009 | | |
| JP | 2009-208660 A | 9/2009 | | |
| JP | 2009-214844 A | 9/2009 | | |
| JP | 2014-533627 A | 12/2014 | | |
| JP | 2017-052328 A | 3/2017 | | |
| JP | 2017-154525 A | 9/2017 | | |
| KR | 101596769 B1 * | 2/2016 | | |
| WO | WO-2008060337 A1 * | 5/2008 | | B60R 22/3413 |
| WO | WO-2012/014380 A1 | 2/2012 | | |
| WO | WO-2014010487 A1 * | 1/2014 | | B60R 22/341 |

OTHER PUBLICATIONS

International Searching Authority, "Written Opinion," issued in connection with International Patent Application No. PCT/JP2019/036284, dated Dec. 3, 2019.

* cited by examiner

SEATBELT RETRACTOR

RELATED APPLICATIONS

The present application claims priority under 37 U.S.C. § 371 to International Patent Application No. PCT/JP2019/036284, filed Sep. 17, 2019, which claims priority to and the benefit of Japanese Patent Application No. 2018-196023, filed on Oct. 17, 2018. The contents of these applications are hereby incorporated by reference in their entireties.

TECHNICAL FIELD

The present invention relates to a seatbelt retractor including an EA stopper mechanism and used in a vehicle such as an automobile. More specifically, the present invention relates to a seatbelt retractor with a torsion bar incorporated in a spool.

BACKGROUND ART

In known seatbelt retractors equipped with a pretensioner, a torsion bar is passed through an inner hole of a spool, and the torsion bar can be fixed at one end to the spool and locked at the other end onto the frame of the seatbelt retractor (PTLs 1 and 2). In the event of an emergency such as vehicle collision, the spool is rotationally driven by the pretensioner to wind up the webbing. Subsequently, as a force is exerted on the spool in the webbing unwinding direction, the torsion bar is twisted, and the spool gradually rotates to gradually unwind the webbing. As a result, a portion of the kinetic energy exerted on the occupant's body is absorbed through the twisting of the torsion bar to thereby mitigate impact.

PTL 1 describes restricting the amount of twisting of the torsion bar through movement of a stopper in threaded engagement with the torsion bar.

CITATION LIST

Patent Literature

PTL 1: JPH 11-222100 A
PTL 2: JP 2017-154525 A

SUMMARY OF INVENTION

Technical Problem

A problem with the seatbelt retractor described in PTL 1 is that the stopper may become displaced, which causes the amount of twisting of the torsion bar to deviate from a target value. More specifically, PTL 1 gives no consideration as to the control of the relative phases of the locking base and the threaded part of the stopper. This means that if the flange part of the locking base, and the stopper are mounted such that the flange part and the stopper are separated by a predetermined distance from each other, it is not possible to regulate the phase (angle) of the gear part of the stopper relative to the locking base. The phase of the locking base relative to the spool is regulated by means of a torsion bar with opposite polygonal-shaped ends, one of which comes into fitting engagement with the locking base and the other comes into fitting engagement with the spool. Accordingly, in mounting together these four components, that is, the locking base, the stopper, the spool, and the torsion bar, the stopper needs to be rotated in some direction to a position that allows the stopper to come into fitting engagement with the spool. As the stopper threadedly advances at this time, deviations/variations occur in the distance of separation from the flange part of the locking base. If the torsion bar has a hexagonal end portion, a maximum variation of 60 degrees (360 degrees divided by 6) occurs.

It is an object of the present invention to provide a seatbelt retractor with an EA (Energy Absorbing) stopper, the seatbelt retractor allowing the amount of twisting of the torsion bar during EA operation to accurately match a target value.

Solution to Problem

A seatbelt retractor of the present invention comprises: a frame that supports a spool and a locking base; the spool onto which a webbing is wound, the spool having a first inner hole and being tubular in form; the locking base disposed coaxially with and adjacent to the spool, the locking base having a second inner hole, the locking base being coupled to the spool by a torsion bar; and the torsion bar passed through the first inner hole of the spool and through the second inner hole of the locking base, the torsion bar being non-rotatably coupled at a position near one end thereof to the spool and being non-rotatably coupled at a position near another end thereof to the locking base, the torsion bar undergoing torsional deformation when, with the locking base being in a locked state, the webbing is subjected to a tensile force greater than or equal to a predetermined value, wherein the locking base has a male-threaded part in an outer periphery surface of the locking base, wherein a female-threaded part in an inner periphery surface of the stop gear, and a female-threaded part in an inner periphery surface of the positioning member are threadedly engaged with the male-threaded part, wherein the stop gear has a protrusion that protrudes from an outer periphery of the stop gear, wherein the protrusion is configured to engage with a groove to allow the stop gear to rotate always integrally with the spool, the groove being provided in an inner periphery surface of the first inner hole such that the groove extends in a direction parallel to an axis of the spool, wherein the positioning member is non-engaged with the spool, wherein in a state prior to vehicle collision, the stop gear and the positioning member are separated from each other by a predetermined distance, and wherein when the seatbelt retractor is in an EA operation where the spool is rotating while the locking base is being stopped from rotating while the stop gear rotates together with the spool and threadedly advances toward the positioning member along the locking base.

In one embodiment of the present invention, the seatbelt retractor comprises a sliding part where the male-threaded part of the locking base and the positioning member slide relative to each other with sliding resistance.

In one embodiment of the present invention, the positioning member does not make contact with the spool prior to vehicle collision.

In one embodiment of the present invention, the locking base includes a flange part, a shaft part, and the male-threaded part, the shaft part protruding from a central portion of the flange part, the shaft part having the second inner hole and being tubular in form, the male-threaded part being provided in a distal end portion of an outer periphery surface of the shaft part, the distal end portion being located near a distal end of the shaft part in a direction in which the shaft part protrudes; and the female-threaded part in the inner periphery surface of the stop gear, and the female-threaded part in the inner periphery surface of the positioning member are threadedly engaged with the male-threaded part.

In one embodiment of the present invention, in a state prior to vehicle collision, the stop gear is located in a portion of the male-threaded part in the outer periphery surface of the shaft part, the portion being located near a proximal end of the shaft part; the positioning member is located closer to the distal end of the shaft part than the stop gear is; and when the seatbelt retractor is in an EA operation where the spool is rotating with the torsion bar twisting while the locking base is being stopped from rotating, the stop gear threadedly advances toward the positioning member until the stop gear comes into contact with the positioning member.

In one embodiment of the present invention, the stop gear has the protrusion provided at a plurality of circumferential locations on an outer periphery surface of the stop gear; and the inner hole of the spool has a plurality of the grooves.

In one embodiment of the present invention, the one end of the torsion bar has a polygonal-shaped or gear-shaped part, and engages with a serration provided at a back portion of the first inner hole.

Advantageous Effects of Invention

With the seatbelt retractor according to the present invention, in a state prior to collision of a vehicle or other such emergency (to be referred to as vehicle collision hereinafter), the spool, the torsion bar, and the locking base, as well as the stop gear and the positioning member rotate integrally to thereby unwind and wind the webbing.

Subsequently, when a force exerted on the webbing in the unwinding direction from the occupant's body becomes greater than or equal to a load set for the torsion bar, then the lock mechanism acts to keep the locking base stopped from rotating, and the spool rotates while causing the torsion bar to twist. This causes the webbing to be unwound to perform EA (energy absorption) for the occupant.

At this time, as the spool rotates, the stop gear rotates together with the spool and threadedly advances, and the stop gear comes into contact with the positioning member to cause the spool to stop.

According to the present invention, in fabricating the seatbelt retractor, the stop gear is disposed at a specified position, and the positioning member is positioned at a specified distance from the stop gear. Then, in this state, the locking base and the torsion bar are inserted into the spool, and advanced straight on to thereby integrate these components with the spool. This allows the stop gear and the positioning member to be positioned on the locking base at a distance from each other that accurately matches a specified distance.

DESCRIPTION OF EMBODIMENTS

Figure 1:
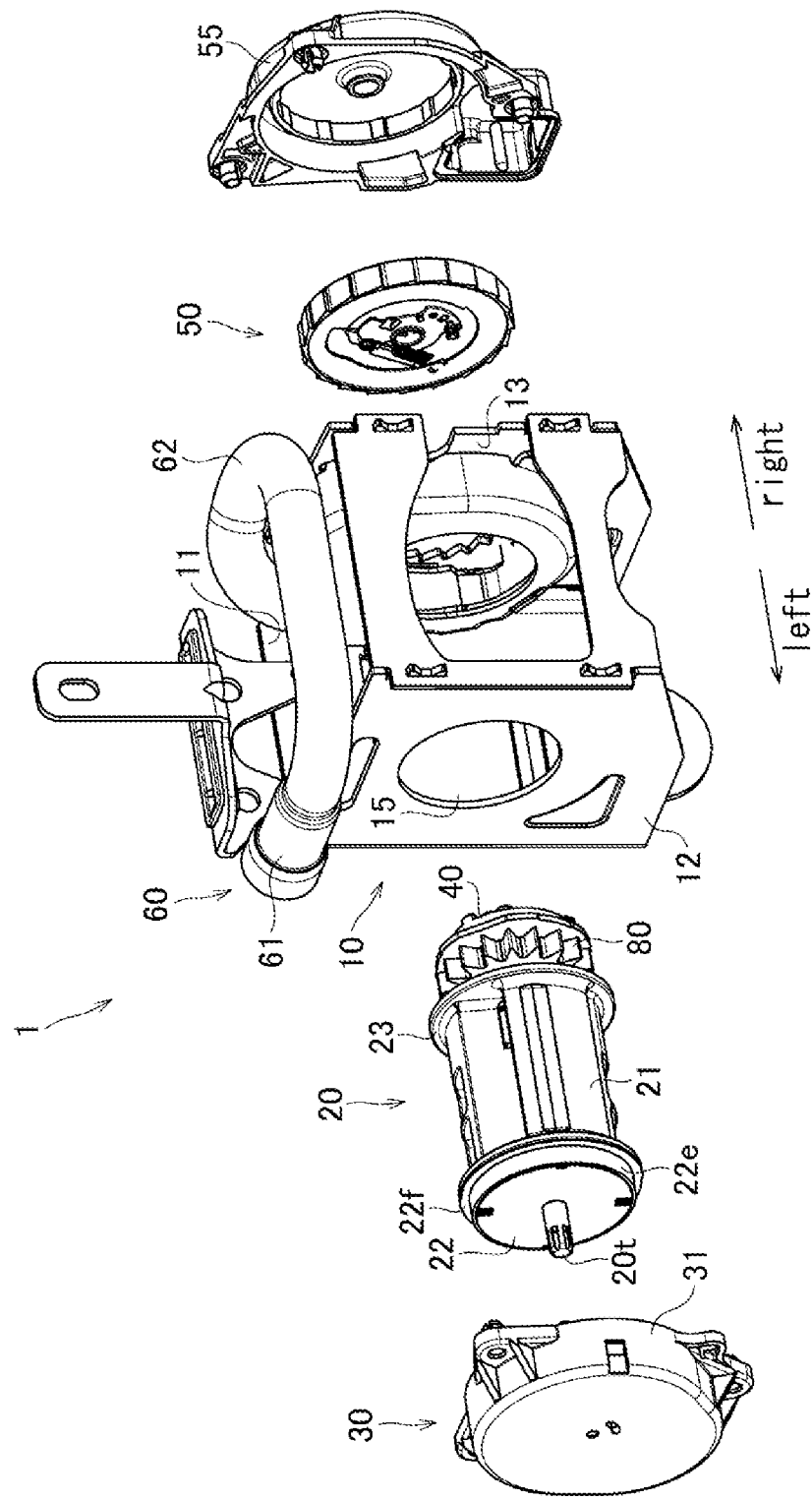
FIG. 1 is an exploded perspective view, as seen from the front side, of a seatbelt retractor according to an embodiment.

An embodiment will be described below with reference to the drawings.

A seatbelt retractor 1 includes the following and other components: a frame 10; a spool 20 rotatably retained on the frame 10; a return spring unit (spiral spring unit) 30 for urging the spool 20 in the webbing winding direction; a locking base 40 that is disposed coaxially with and adjacent to the spool 20, and coupled to the spool 20 by a torsion bar 70; a lock activation unit 50 for activating the locking of the spool 20; a pretensioner 60; and the torsion bar 70 inserted in the spool 20 and the locking base 40 in such a way as to couple the pretensioner 60, the spool 20, and the locking base 40 to each other.

Figure 2:
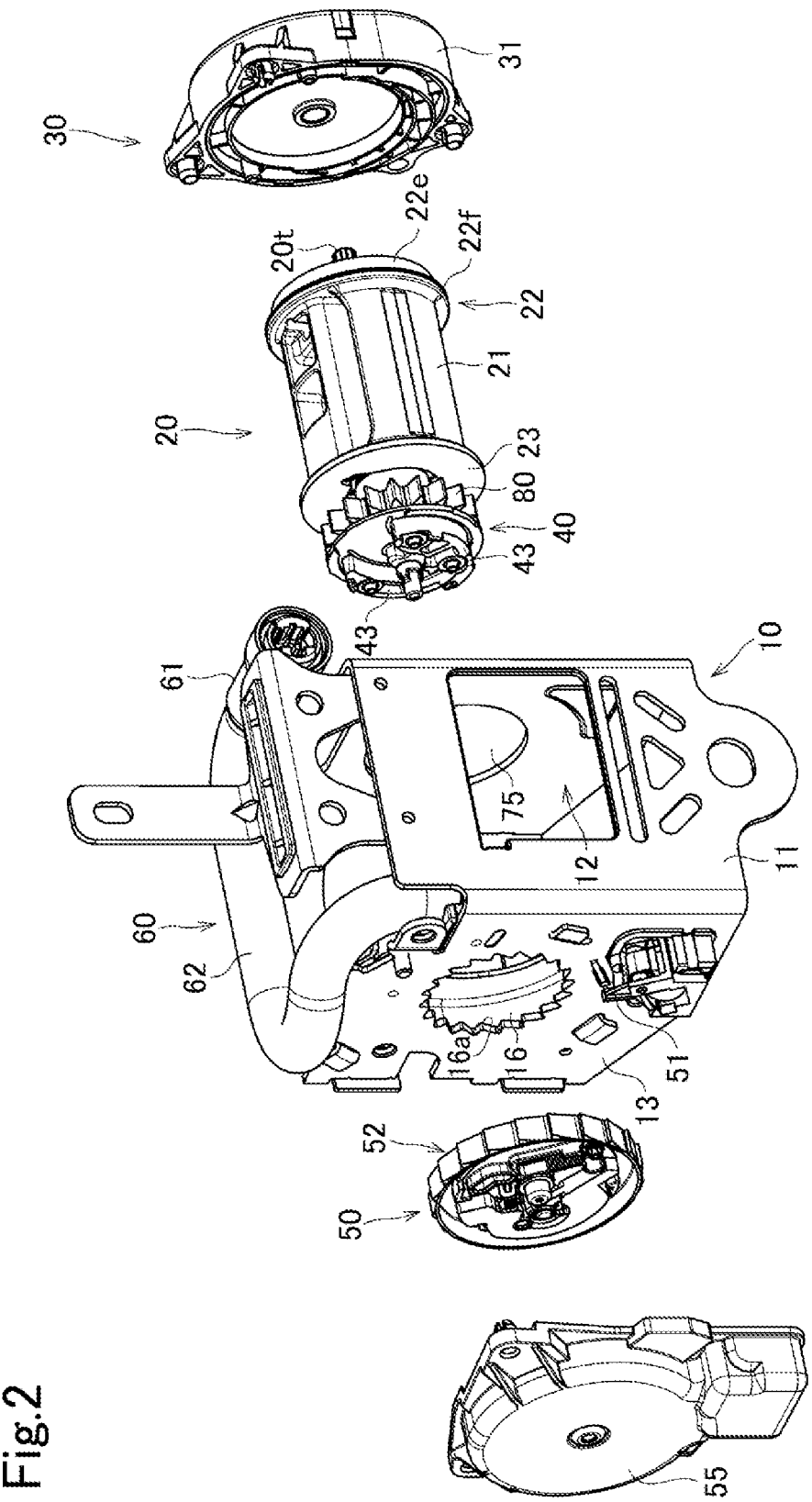
FIG. 2 is an exploded perspective view, as seen from the back side, of the seatbelt retractor according to the embodiment.
Figure 3:
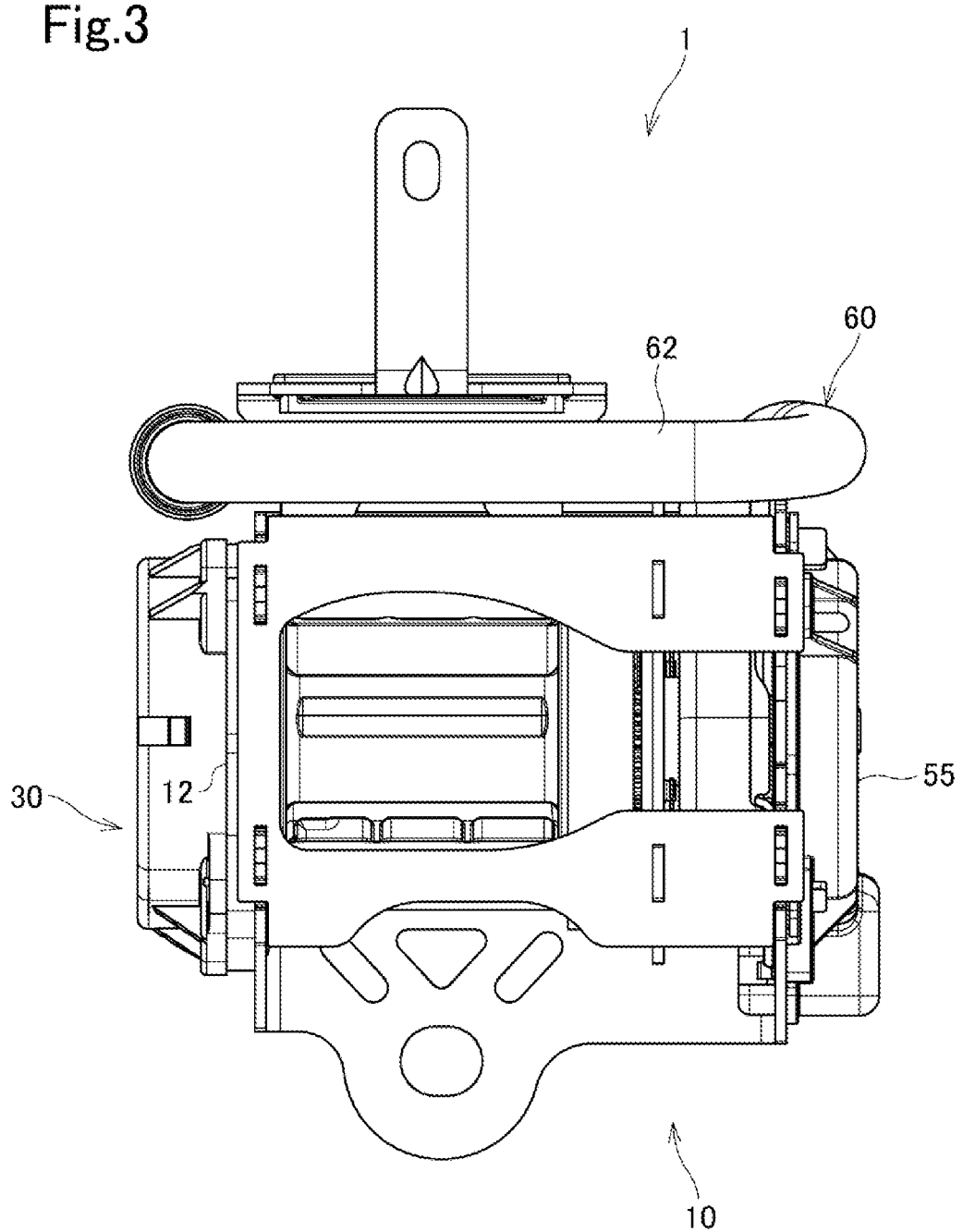
FIG. 3 is a front view of the seatbelt retractor according to the embodiment.
Figure 4:
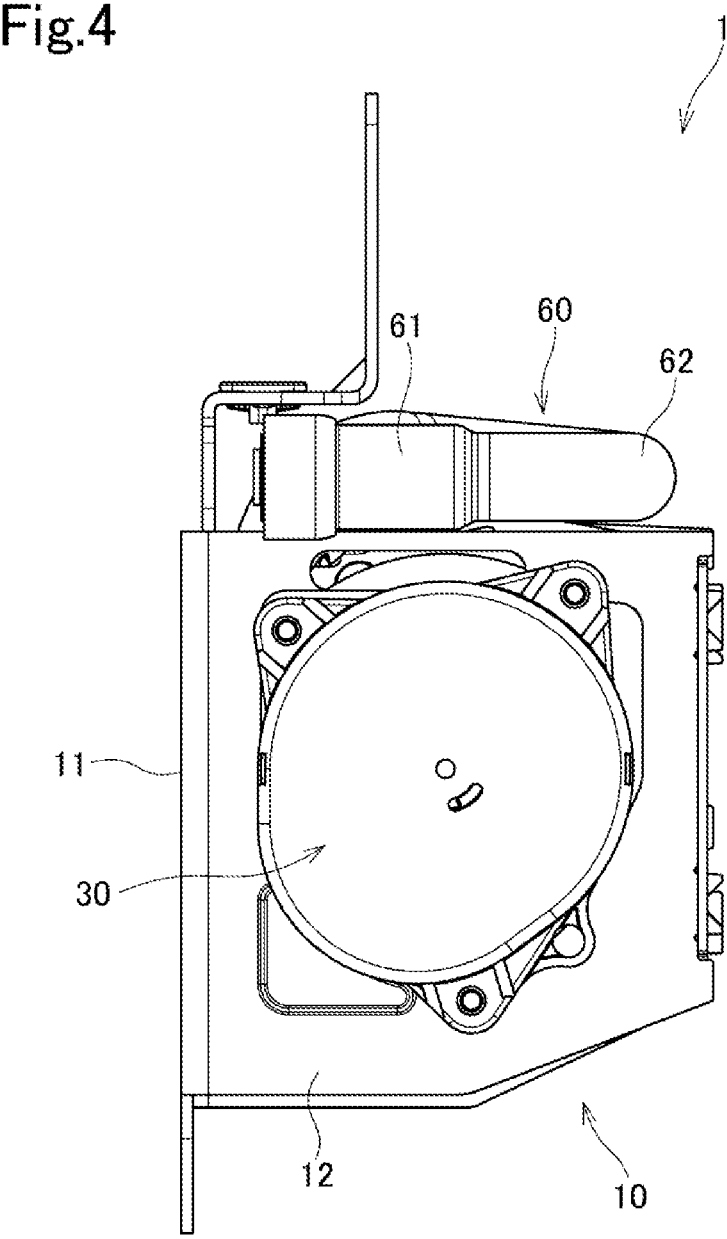
FIG. 4 is a left side view of the seatbelt retractor according to the embodiment.
Figure 5:
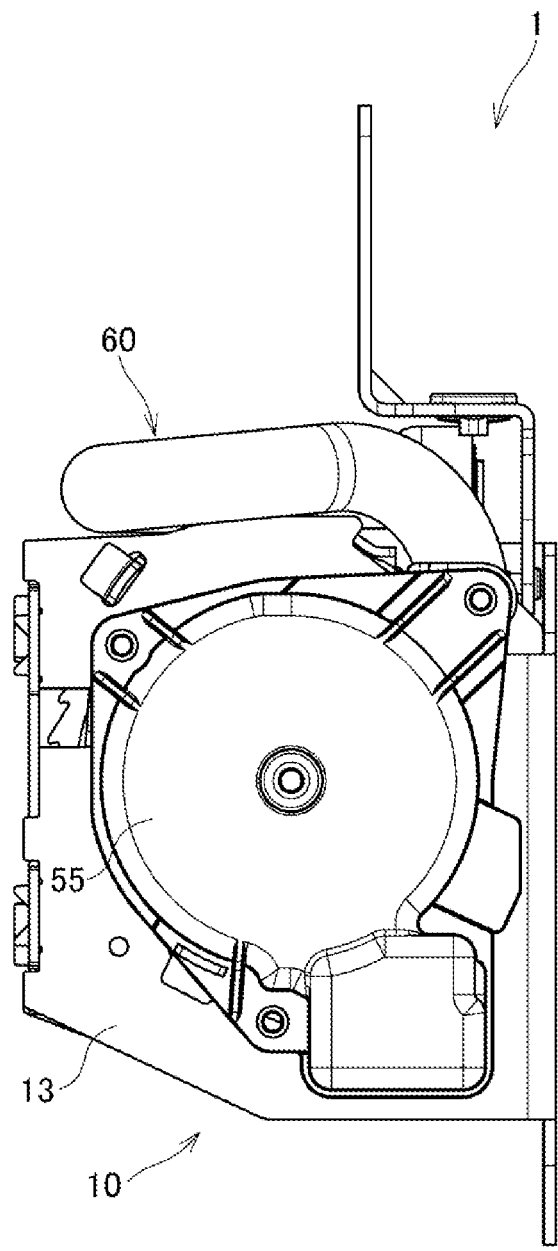
FIG. 5 is a right side view of the seatbelt retractor according to the embodiment.

The frame 10 includes the following and other components: a front wall 11; a left side wall 12 that extends forward from the left side edge of the front wall 11; a right side wall 13 that extends forward from the right side edge of the front wall 11; and spool insertion holes 15 and 16 respectively provided in the side walls 12 and 13. As illustrated in FIG. 2, the spool insertion hole 16 has saw teeth 16a provided in its inner periphery surface.

The return spring unit 30 includes a spiral spring accommodated inside a case 31. One end of the spiral spring is coupled to a projecting shaft 20t, which projects from a center hole 20y located at the left end side of the spool 20. In the embodiment, the projecting shaft 20t projects from the left end of the torsion bar 70. Alternatively, the projecting shaft 20t may project from the spool 20.

The lock activation unit 50 includes a lock assembly 52 with an outer periphery surface with which a pendulum 51 (FIG. 2) retained on the right side wall 13 of the frame engages. When the angular acceleration of the rotation of the lock assembly 52 becomes greater than or equal to a predetermined value, or when the pendulum 51 engages with the outer periphery surface of the lock assembly 52, the lock assembly 52 allows a pawl 43 (FIG. 2) to project from the outer periphery surface of the locking base 40 into engagement with the saw teeth 16a.

The lock assembly 52 and the pendulum 51 are covered with a cover 55.

The lock activation unit 50 is of a known structure.

The pretensioner 60 is used to, upon vehicle collision, wind the spool 20 in the webbing winding direction with a large torque to remove slack in the webbing. The pretensioner 60 includes the following and other components: a gas generator 61 that generates gas upon vehicle collision; a duct 62; and a power transmission component made of synthetic resin or other material loaded in the duct 62. Due to gas pressure from the gas generator 61, the power transmission component is delivered to the outer periphery of a paddle wheel 80 described later in the circumferential direction, which causes the spool 20 to rotate in the webbing winding direction. The configuration described in, for example, PTL 2 may be employed as this configuration.

Reference is now made in detail to the structure of the spool 20 and the structure of the locking base 40.

As explicitly illustrated in FIGS. 6 to 10, the spool 20 has a tubular part 21 onto which to wind the webbing, a left flange 22 located near the left end of the tubular part 21, and a right flange 23 located near the right end of the tubular part 21.

The left flange 22 of the spool 20 has an outer periphery surface 22e that faces the inner periphery surface of the spool insertion hole 15. The left flange 22 has an outward collar 22f provided circumferentially on its outer periphery edge near the tubular part 21, the collar 22f bulging out in the radial direction. The collar 22f slidably contacts an inner surface of the side wall 12 that extends along the peripheral edge portion of the spool insertion hole 15.

The tubular part 21 of the spool 20 has a first inner hole 29 extending from a location near the left end of the tubular part 21 toward the right end. The inner hole 29 has a serration 29a (FIGS. 9 and 10) provided in its deepest portion, that is, near its left end. A gear-shaped part 71 of the torsion bar 70 (not illustrated in FIGS. 7, 9, and 10) engages with the serration 29a.

Figure 9:
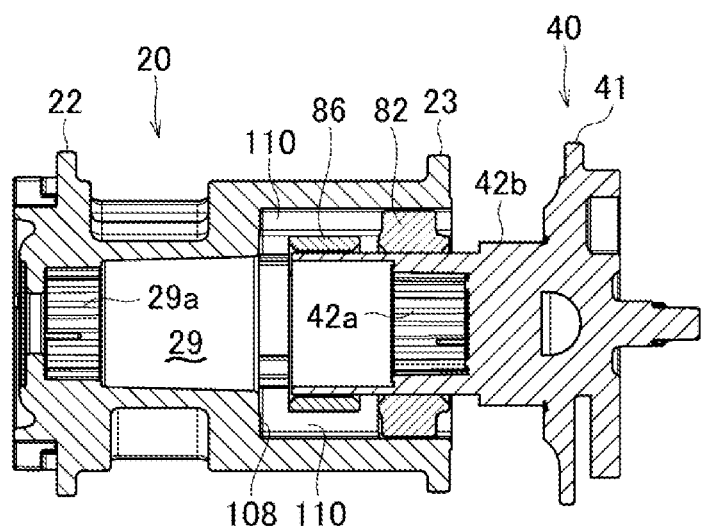
FIG. 9 is a sectional view taken in the axial direction in FIG. 8.
Figure 10:
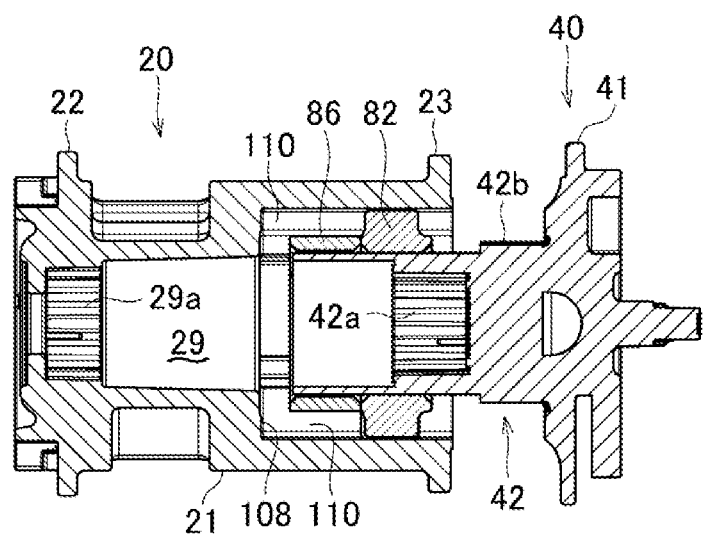
FIG. 10 is a sectional view of the spool and the locking base with a stop gear in contact with a positioning member.

As explicitly illustrated in FIGS. 9 and 10, the first inner hole 29 of the spool 20 has an enlarged diameter in an area extending from a position near the entrance of the first inner hole 29 to a stepped surface 108. The inner periphery surface of the enlarged-diameter portion has grooves 110 serving as a locking part, which extends in parallel to the axis of the spool 20. Protrusions 82b, which are located on the outer periphery surface of a stop gear 82 and serve as an engaging part, engage with the corresponding grooves 110 such that the protrusions 82b are free to slide in a direction parallel to the above-mentioned axis. In the embodiment, two grooves 110 are provided at opposite positions along the diameter of the inner hole 29. The stop gear 82 has two protrusions 82b provided at opposite positions along its diameter such that each protrusion 82b engages with the corresponding groove 110.

The locking base 40 is disposed adjacent and to the right of the spool 20. The locking base 40 includes the following and other components: a flange part 41; a tubular shaft part 42 contiguous with the central portion of the flange part 41; and the pawl 43 provided to the flange part 41. The distal end side of the shaft part 42 is inserted coaxially into the inner hole 29 of the spool 20.

The shaft part 42 has a serration 42a (FIGS. 9 and 10) provided in the inner periphery surface of an inner hole (second inner hole) of the shaft part 42, at a location near the distal end of the shaft part 42. A gear-shaped part 72 (FIG. 6) at the right end of the torsion bar 70 engages with the serration 42a.

The shaft part 42 of the locking base 40 has a hexagonal part 42b, which is a non-circular part, in a portion of the outer periphery near the proximal end (near the flange part 41) of the shaft part 42. The shaft part 42 has a male-threaded part 42c provided in a portion of its outer periphery surface excluding the hexagonal part 42b.

Figure 6:
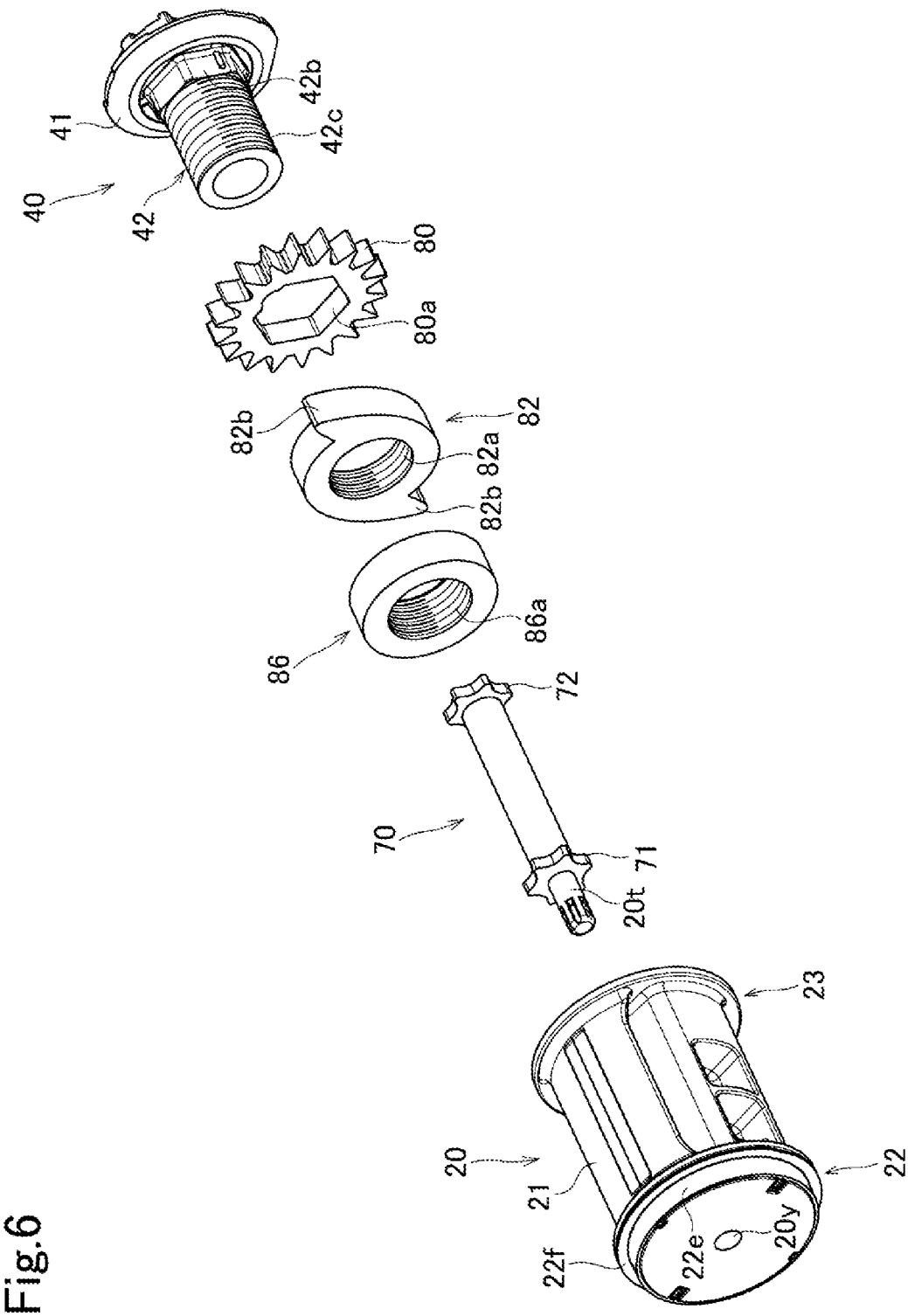
FIG. 6 is an exploded perspective view of a spool, a torsion bar, and a locking base with the spool seen from the left side.
Figure 7:
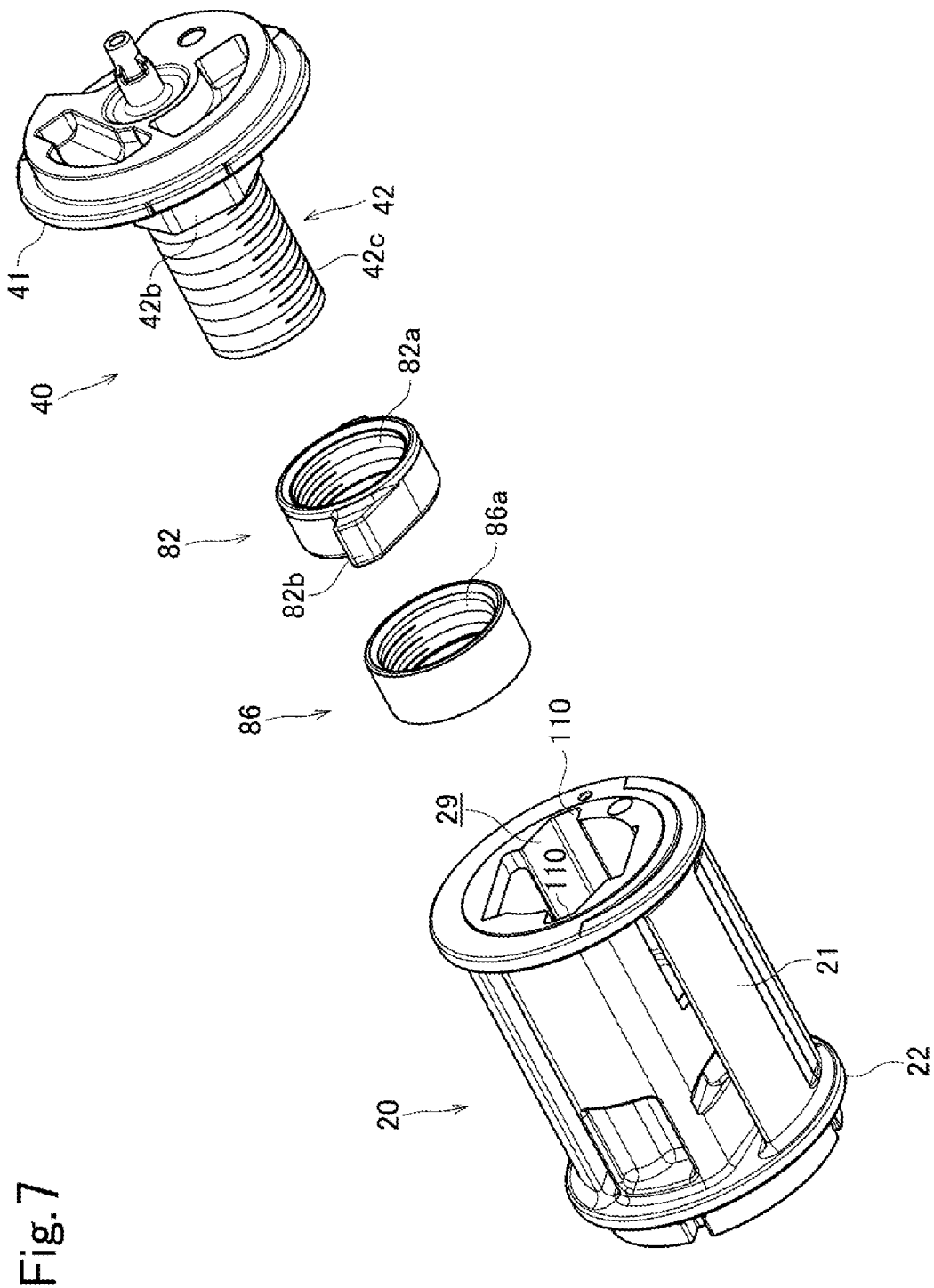
FIG. 7 is an exploded perspective view of the spool and the locking base with the spool seen from the right side.
Figure 8:
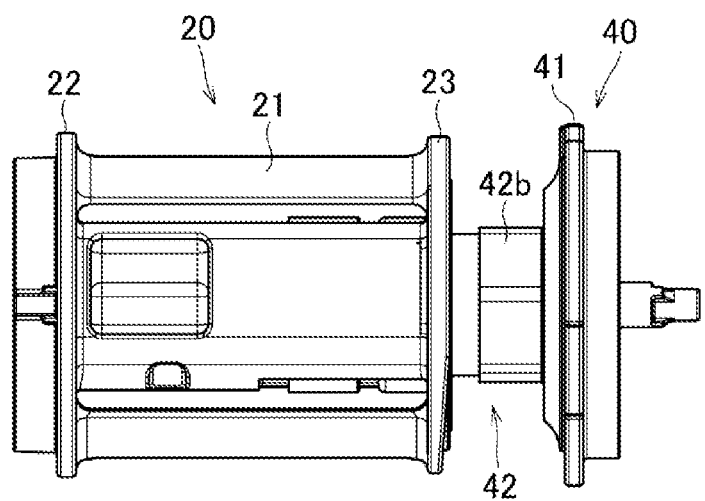
FIG. 8 is a front view of the spool and the locking base with a paddle removed.

As illustrated in FIG. 6, the paddle wheel 80 (not illustrated in FIGS. 7 to 10) has a hexagonal inner hole 80a that engages with the hexagonal part 42b. The paddle wheel 80 fits onto the shaft part 42 in such a way that the paddle wheel 80 is unable to rotate in the circumferential direction.

As the power transmission component made of synthetic resin or other material is supplied from the duct 62 of the pretensioner 60 to the outer periphery of the paddle wheel 80, the paddle wheel 80 rotates, which causes the locking base 40 to rotate.

Female-threaded parts 82a and 86a, which are respectively provided in the inner periphery surface of the stop gear 82 and the inner periphery surface of a positioning member 86, threadedly engage with the male-threaded part 42c. The stop gear 82 and the positioning member 86 are capable of threadedly advancing along the male-threaded part 42. As described above, the outer periphery surface of the stop gear 82 has the protrusions 82b. In the embodiment, the stop gear 82 is located near the proximal end of the shaft part 42, and the positioning member 86 is located near the distal end of the shaft part 42 relative to the stop gear 82.

The positioning member 86 is in the form of a circular ring, and does not engage with the inner periphery surface of the inner hole 29 of the spool 20.

The locking base 40 is mounted to the spool 20 via the torsion bar 70. This mounting is performed as described below. The paddle wheel 80 is fit onto the hexagonal part 42b of the locking base 40, and the stop gear 82 and the positioning member 86 are threadedly engaged onto the male-threaded part 42c. At this time, the stop gear 82 is positioned near the proximal end of the male-threaded part 42c. The positioning member 86 is positioned to be substantially in contact with the stop gear 82.

Then, a portion of the torsion bar 70 near the right end (near the gear-shaped part 72) is inserted into the shaft part 42 of the locking base 40, and the gear-shaped part 72 is brought into engagement with the serration 42a.

Subsequently, the gear-shaped part 71 of the torsion bar 70, and the serration 29a of the spool 20 are aligned in phase with each other. More specifically, the torsion bar 70 is inserted into the inner hole 29 and advanced straight on to the back of the inner hole 29. Then, the torsion bar 70 and the locking base 40 are aligned in phase with each other such that the gear-shaped part 71 is fit into the serration 29a of the spool 20 directly (i.e., without performing phase adjustment in the circumferential direction).

Subsequently, in this state, the phase of the stop gear 82 is adjusted such that the protrusions 82b of the stop gear 82 are aligned in phase with the corresponding grooves 110 of the spool 20. Then, if there is any gap between the stop gear 82 and the positioning member 86, the positioning member 86 is rotated into contact with the stop gear 82.

Subsequently, the positioning member 86, which is now in contact with the stop gear 82 as described above, is rotated a specified number of times to move the positioning member 86 away from the stop gear 82 by a specified distance.

Thereafter, an assembly made up of the above-mentioned components whose phases and positions have been determined as described above, namely the locking base 40, the paddle wheel 80, the stop gear 82, the positioning member 86, and the torsion bar 70, is inserted into the inner hole 29 of the spool 20. Then, with the protrusions 82b of the stop gear 82 being engaged with the grooves 110, the assembly is advanced straight on to bring the gear-shaped part 71 of the torsion bar 70 into engagement with the serration 29a.

As a result, the locking base 40, the torsion bar 70, and other components, and the spool 20 are integrated together with the positioning member 86 and the stop gear 82 being separated by a specified distance from each other.

As described above, for the seatbelt retractor 1 including the spool 20 with components such as the locking base 40 and the torsion bar 70 mounted thereto, under normal conditions, the stop gear 82 is located near the proximal end of the male-threaded part 42c of the locking base 40, and the positioning member 86 is separated by the above-mentioned specified distance from the stop gear 82 toward the distal end of the male-threaded part 42c. Under normal conditions, due to the engagement between the gear-shaped part 71 and the serration 29a, the torsion bar 70 and the locking base 40, and the stop gear 82 and the positioning member 86 that are threadedly attached onto the locking base 40, always rotate integrally with the spool 20.

As the spool 20 rotates with the unwinding and winding of the webbing, the spool 20, the torsion bar 70, the locking base 40, the stop gear 82, and the positioning member 86 all rotate integrally, and thus the distance between the stop gear 82 and the positioning member 86 remains unchanged.

To prevent the positioning member 86 from moving under the inertial force resulting from the rotation for unwinding or winding the webbing under normal conditions, an anti-sliding agent is applied on the sliding part between the positioning member 86 and the male-threaded part 42c of the locking base 40.

Upon vehicle collision, the pendulum 51 engages with the outer periphery surface of the lock assembly 52, and the lock activation unit 50 causes the pawl 43 to project through the outer periphery surface of the locking base 40. The projected pawl 43 engages with the saw teeth 16a provided in the right side wall 13.

During a light collision involving a small vehicle deceleration at the time of collision, the pretensioner 60 does not activate. Due to the engagement between the pawl 43 and the saw teeth 16a, the spool 20 is prevented from rotating, and the occupant is restrained by the webbing. During such a light collision, the spool 20 does not rotate as mentioned above. Since the pretensioner 60 does not activate, the locking base 40 does not rotate, either. As a result, neither the stop gear 82 nor the positioning member 86 rotates, and the stop gear 82 and the positioning member 86 thus remain stopped at their original positions.

In the event of a vehicle collision serious enough to cause the vehicle to decelerate at a rate greater than or equal to a predetermined value, the gas generator 61 of the pretensioner 60 activates, and a strong torque is applied to the locking base 40 in the webbing winding direction via the paddle wheel 80. This causes the locking base 40, the torsion bar 70, and the spool 20 to rotate integrally in the webbing winding direction. As a result, the webbing is wound onto the spool 20, and slack in the webbing is removed.

In this state, the locking base 40 rotates in the webbing winding direction without being restrained by the saw teeth 16a. Further, the spool 20, and the locking base 40 rotate integrally via the torsion bar 70 in the same direction and at the same rotation speed. In this case, the stop gear 82 and the positioning member 86 also rotate integrally with the locking base 40 in the same direction and at the same rotation speed. Thus, the stop gear 82 and the positioning member 86 remain located at their respective original positions on the male-threaded part 42c of the locking base 40.

As the winding of the webbing proceeds, and slack in the webbing is removed, the spool 20 is temporarily stopped, and the winding of the webbing by the spool 20 stops. Then, due to a force exerted on the spool 20 by the webbing in the webbing unwinding direction, the spool 20 starts to rotate in the webbing unwinding direction while causing the torsion bar 70 to twist (EA operation). Due to the pressure-retaining action of the pretensioner 60, the locking base 40 coupled to the spool 20 via the torsion bar 70 is prevented from rotating in the webbing unwinding direction. As a result, the spool 20 rotates while causing the torsion bar 70 to twist (EA rotation), which causes the webbing to be unwound. The torsional deformation of the torsion bar 70 absorbs the kinetic energy resulting from the forward movement of the occupant.

When, with the locking base 40 stopped as described above, the spool 20 rotates in the webbing unwinding direction (EA rotation), the stop gear 82 rotates integrally with the spool 20 via the protrusions 82b and the grooves 110, and threadedly advances toward the positioning member 86. During this EA rotation of the spool 20, the positioning member 86 remains stopped without rotating. As a result, the distance between the stop gear 82 and the positioning member 86 gradually decreases.

As the stop gear 82 rotates a predetermined number of times, eventually the stop gear 82 comes into contact with the positioning member 86 as illustrated in FIG. 10, which disables further threaded advancement. As a result, the spool 20 is prevented from rotating by the locking base 40 via the stop gear 82 and the positioning member 86. As the spool 20 is thus prevented from rotating, further unwinding of the webbing (unwinding for EA) is stopped.

In the embodiment, the distance that the stop gear 82 threadedly advances before coming into contact with the positioning member 86 accurately matches a preset distance between the stop gear 82 and the positioning member 86.

The embodiment above is only one exemplary embodiment of the present invention, and the present invention may be practiced in ways other than those described above.

In the embodiment above, the positioning member 86 is positioned closer to the distal end of the shaft part 42 than the stop gear 82 is. Alternatively, the relative positioning of these components may be reversed such that during EA operation, the stop gear 82 positioned near the distal end of the shaft part 42 threadedly advances toward the positioning member 86 positioned near the proximal end of the shaft part 42.

Although specific aspects of the present invention have been described herein in detail, it will be apparent to those skilled in the art that other modifications may be made without departing from the spirit and scope of the present invention.

REFERENCE SIGNS LIST 1 seatbelt retractor
10 frame
16a saw teeth
20 spool
22 left flange
23 right flange
29 first inner hole
29a serration
30 return spring unit
40 locking base
41 flange part
42 shaft part
42a serration
42b hexagonal part
42c male-threaded part
43 pawl
50 lock activation unit
52 lock assembly
60 pretensioner
70 torsion bar
71, 72 gear-shaped part
80 paddle wheel
82 stop gear
86 positioning member
110 groove

The invention claimed is:
1. A seatbelt retractor comprising:
a frame that supports a spool and a locking base;
the spool onto which a webbing is wound, the spool having a first inner hole and being tubular in form;

the locking base disposed coaxially with and adjacent to the spool, the locking base having a second inner hole, the locking base being coupled to the spool by a torsion bar; and the torsion bar passed through the first inner hole of the spool and through the second inner hole of the locking base, the torsion bar being non-rotatably coupled at a position near one end thereof to the spool and being non-rotatably coupled at a position near another end thereof to the locking base, the torsion bar undergoing torsional deformation when, with the locking base being in a locked state, the webbing is subjected to a tensile force greater than or equal to a predetermined value, wherein the locking base has a male-threaded part in an outer periphery surface of the locking base, wherein a female-threaded part in an inner periphery surface of a stop gear, and a female-threaded part in an inner periphery surface of a positioning member are threadedly engaged with the male-threaded part, wherein the stop gear has a protrusion that protrudes from an outer periphery of the stop gear, wherein the protrusion is configured to engage with a groove to allow the stop gear to rotate always integrally with the spool, the groove being provided in an inner periphery surface of the first inner hole such that the groove extends in a direction parallel to an axis of the spool, wherein the positioning member is non-engaged with the spool, wherein in a state prior to vehicle collision, the stop gear and the positioning member are separated from each other by a predetermined distance, and wherein when the seatbelt retractor is in an energy absorbing operation where the spool is rotating while the locking base is being stopped from rotating, the stop gear rotates together with the spool and threadedly advances toward the positioning member along the locking base.

2. The seatbelt retractor according to claim 1, wherein the seatbelt retractor comprises a sliding part comprising the male-threaded part of the locking base and the positioning member, which slide relative to each other with sliding resistance.

3. The seatbelt retractor according to claim 1, wherein the positioning member does not make contact with the spool prior to vehicle collision.

4. The seatbelt retractor according to claim 1, wherein the locking base includes a flange part, a shaft part, and the male-threaded part, the shaft part protruding from a central portion of the flange part, the shaft part having the second inner hole and being tubular in form, the male-threaded part being provided in a distal end portion of an outer periphery surface of the shaft part, the distal end portion being located near a distal end of the shaft part in a direction in which the shaft part protrudes; and wherein the female-threaded part in the inner periphery surface of the stop gear, and the female-threaded part in the inner periphery surface of the positioning member are threadedly engaged with the male-threaded part.

5. The seatbelt retractor according to claim 4, wherein in a state prior to vehicle collision, the stop gear is located in a portion of the male-threaded part in the outer periphery surface of the shaft part, the portion being located near a proximal end of the shaft part;

wherein the positioning member is located closer to the distal end of the shaft part than the stop gear is; and wherein when the seatbelt retractor is in energy absorbing operation, the stop gear threadedly advances toward the positioning member until the stop gear comes into contact with the positioning member.

6. The seatbelt retractor according to claim 1, wherein the stop gear has the protrusion provided at a plurality of circumferential locations on an outer periphery surface of the stop gear; and wherein the inner hole of the spool has a plurality of the grooves.

7. The seatbelt retractor according to claim 1, wherein the one end of the torsion bar has a polygonal-shaped or gear-shaped part, and engages with a serration provided at a back portion of the first inner hole.

* * * * *